United States Patent
Izumo et al.

[15] 3,674,762
[45] July 4, 1972

[54] METHOD FOR PREPARING POLYTETRAFLUOROETHYLENE MOLDING POWDER

[72] Inventors: Masanori Izumo; Tatsushiro Yoshimura, both of Osaka-fu, Japan

[73] Assignee: Daikin Kogyo Co., Ltd., Osaka, Japan

[22] Filed: July 17, 1970

[21] Appl. No.: 55,962

[30] Foreign Application Priority Data

July 18, 1969 Japan..................................44/57254

[52] U.S. Cl..................................260/87.5, 259/1, 260/92.1
[51] Int. Cl..........................................C08f 3/24, C08f 15/06
[58] Field of Search..................................260/92.1 S, 87.5 A

[56] References Cited

UNITED STATES PATENTS

| | | | |
|---|---|---|---|
| 3,532,782 | 10/1970 | Hartwimmer | 260/87.5 A |
| 2,936,301 | 5/1960 | Thomas et al. | 260/92.1 S |
| 3,010,950 | 11/1961 | Thomas | 260/92.1 S |
| 3,413,276 | 11/1968 | Hoashi et al. | 260/87.5 A |
| 3,527,857 | 9/1970 | Fitz | 260/87.5 A |
| 3,528,955 | 9/1970 | Lippman | 260/92.1 S |

*Primary Examiner*—Harry Wong, Jr.
*Attorney*—Stevens, Davis, Miller & Mosher

[57] ABSTRACT

Preparation of a free-flowing polytetrafluoroethylene molding powder by mechanically agitating polytetrafluoroethylene powder under a reduced pressure less than 500 mmHg (absolute). The obtained granular powder has good flowability, extremely little aggregates and high bulk density.

6 Claims, No Drawings

METHOD FOR PREPARING POLYTETRAFLUOROETHYLENE MOLDING POWDER

The present invention relates to a method for preparing polytetrafluoroethylene molding powder, and particularly to a method for preparing polytetrafluoroethylene molding powder having good powder flowability, extremely little aggregates and high bulk density.

The methods for molding polytetrafluoroethylene differ from those used in molding other thermoplastic resins, such as melt-extrusion molding and melt-injection molding, in that the methods used for molding polytetrafluoroethylene are similar to those used in powder metallurgy. Thus, polytetrafluoroethylene molding powder must have a number of special characteristics. The three most important characteristics are (1) good powder flowability, (2) extremely little aggregates and (3) high bulk density of the powder. If powder possesses good flowability and does not form aggregates, the uniform filling into molds can be readily accomplished. These requirements are particularly important when the molding is carried out by means of automatic molding apparatus or in the preparation of thin shaped article. On the other hand, in forming shaped articles of identical configuration, a smaller mold than usual can be used when using a powder of high bulk density. For instance, when forming identical cylindrical bodies from powder having bulk densities of 0.25 g./ml. and 0.5 g./ml., the mold for the latter powder need be only half the size of that for the former.

However, polytetrafluoroethylene powder obtained by polymerizing tetrafluoroethylene and pulverizing the resultant polymer possesses extremely bad flowability and low bulk density, and may be readily aggregated. Then, it has been requested to obtain an improved polytetrafluoroethylene molding powder which satisfies the above requirements, from the pulverized powder, and for that purpose the following method for preparing the molding powder hitherto has been proposed. The method is so-called agitation method which comprises adding water and/or an organic liquid to polytetrafluoroethylene powder and then agitating the mixture to make its granular particles. According to such a method, the above-mentioned flowability, the tendency to aggregates and bulk density may be improved to some extent, but it is accompanied with many disadvantages; that is, thus obtained granular powder must be dried after agitation because of containing water and/or organic solvent therein, and, in the case of using organic liquid, the shaped articles molded from the granular powder tend to be discolored resulting from the decomposition of the organic liquid which has not been thoroughly removed off and further to give human being a harmful influence by vapor of the organic liquid.

An object of the present invention is to provide a novel method for preparing a high quality polytetrafluoroethylene molding powder by a simple procedure.

Another object of the invention is to provide a method for preparing readily a free-flowing polytetrafluoroethylene molding powder without the use of water or any organic liquid.

Further object of the invention is to provide a polytetrafluoroethylene molding powder without the above-mentioned disadvantages.

More further object of the invention is to provide a high quality polytetrafluoroethylene molding powder possessing good flowability, extremely little aggregates and high bulk density.

Other objects of the invention will be apparent from the following disclosure.

The above-mentioned objects have now been accomplished by subjecting polytetrafluoroethylene powder to mechanical agitation so as to make contact, bump or tumble the powder with each other or against the internal wall surface of the agitation vessel, under the specific reduced pressure and at the specific temperature.

According to the present invention, the procedure can be readily carried out without the use of water or any organic liquid and the drying step. There are no problems such as discoloring in the shaped articles or harmful influence against human being. It can be simplified to prepare polytetrafluoroethylene molding granular powder, and the resultant powder has smooth and glossy surface and the internal structure of relatively compact density. Besides, the molding powder of the present invention possesses excellent flowability, non-aggregates and high bulk density, and thereby may be molded compactly even under a lower pressure than that applied ordinarily to polytetrafluoroethylene molding powder. By the use of the granular powder, therefore, the filling into molds can be uniformly and readily carried out as well as the molding into thin shaped article and the automatic molding. Also, it does not aggregate on storage or transport. The smaller mold than usual can be used because of its high bulk density.

As the starting polytetrafluoroethylene powder, there can be used that obtained by polymerizing tetrafluoroethylene monomer according to a conventional suspension polymerization or bulk polymerization and then pulverizing the resultant polytetrafluoroethylene by a pulverizer, e.g., Atomizer, Ultramizer, Hurricane Mill, Jet-O-Mizer, or the like. An average diameter of the desired powder particle is smaller than 300 $\mu$, preferably smaller than 200 $\mu$. As a polytetrafluoroethylene to be used in the present invention, there can be used not only homo-polymer of tetrafluoroethylene, but also co-polymer containing less than 5 percent by weight of other co-polymerizable monomer unit, e.g., hexafluoropropylene, trifluorochloroethylene, or the like.

The method of the present invention can be carried out by subjecting the above-mentioned starting polytetrafluoroethylene powder to mechanical agitation, as described below, under the specific reduced pressure and at the specific temperature.

The term "mechanical agitation," as used herein, is meant to make contact, bump or tumble the powder with each other or against the internal wall surface of the agitation vessel, and as an operation for the mechanical agitation there are stirring, tumbling, mixing and shaking.

As an apparatus for operating the mechanical agitation of the powder, there may be effectively used all of the conventional devices for stirring, tumbling, mixing and shaking of powder; for instance, rotary vessel mixers such as horizontal cylinder type, declining cylinder type, V-type and cone type (if necessary, a stirrer or buffle plate may be provided within such mixer), fixed vessel mixers having agitator such as propeller type, ribbon type and screw type; kneader mixers such as kneader and edge-runner; and vibrating mixer, and the like.

In the method of the present invention, it is essential to carry out the mechanical agitation under the specific reduced pressure, i.e., less than 500 mmHg (absolute). In case of operating under a pressure more than 500 mm Hg, the flowability may be increased to some extent but the necessary period for the operation is remarkably prolonged, and therefore it is unpractical. On the contrary, the less reduced pressure is used, the higher effect may be obtained. The suitable pressure is less than 300 mm Hg, particularly 100 mm Hg. As an operating temperature, it is necessary to be selected from the range of 10° to 130° C. In case the procedure carried out at a lower temperature than the range, the desired effect of the present invention can not be expected. In case of higher temperature the powder can not be uniformly agitated because of its aggregates, and further it tends to lump on the whole. The preferable temperature range is about 25° to 70° C. Accompanying with the mechanical agitation, temperature of the powder tends to elevate and it is preferable to control the temperature. The suitable operation period is varied according to a kind of apparatus used and operating condition such as mechanical power, pressure, temperature, etc., but usually it is necessary to operate for more than 1 minute, preferably about 10 to 60 minutes.

The following Examples serve to illustrate the various embodiments of the present invention.

EXAMPLE 1

A cylindrical vessel (internal diameter: 600 mm., height: 1,200 mm.) provided with a paddle agitator of 500 mm. rotating diameter, was charged with 40 kg. of polytetrafluoroethylene powder (average particle size: 25 – 30 $\mu$, bulk density: 0.30 g./ml.) and closed. The power was subjected to mechanical agitation for 30 minutes under the condition of a pressure of 500 mm Hg (absolute), a temperature of 30° C. and an agitation velocity of 140 r.p.m.

As Control, the procedure was repeated in the same manner as described in Example 1 except normal pressure was used instead of the pressure of 500 mm Hg.

The experimental results are shown in the following Table 1.

TABLE 1

|  | Example 1 | Control |
|---|---|---|
| Operating pressure (mmHg, absolute) | 500 | 760 |
| Obtained granular powder: |  |  |
| Average particle size ($\mu$) | 70 | 25 |
| Bulk density (g/ml.) | 0.38 | 0.30 |
| Angle of repose | 57° | 66° |

(Note) The measurement of the angle of repose was carried out as follows: A stainless steel funnel of 40 mm. in height and having an internal diameter of 40 mm. at the top and 6 mm. at the bottom is provided at its lower outlet with a tube of 3 mm. long having a constant internal diameter of 6 mm. located 20 mm. above the floor. The powder was gently passed downwards through the funnel. The powder piles up on the floor in nearly a conical shape and the radius ($r$) of the base of the cone was measured. The angle of repose ($\theta$) was given by:

$$\theta = \tan^{-1}(20/r)$$

The measurement of the angle of repose of the powder was carried out at 23° C., and the powder must be completely dried and free of static electricity.

From the results of Table 1, it can be understood that the angle of repose of the obtained granular powder in Example 1 is smaller, i.e., flowability and bulk density are increased, compared with that in Control.

The aggregation test of the above granular powder was carried out as follows: A cylindrical vessel of 250 mm. in diameter was charged with 1 kg. of the sample powder and then dropped down on the floor from the position of 35 to 40 mm. in height. The dropping operation was repeated by the cycle of one time per second, for one hour (total droppings: about 3,600 times). The operating temperature was 40° to 45° C. (This was selected from a range of the temperature more than 30° C. at which polytetrafluoroethylene is readily aggregated.) After one hour, a whole amount of the powder was obtained in a form of an aggregated mass having spongy cake structure. From the mass was cut out a sample of 60 mm. × 60 mm. × 20 mm., and it was treated by an automatically vibrating screen to break out the aggregated sample mass. A period required until the sample mass was completely broken out was 55 seconds.

On the other hand, the mass obtained from the powder in Control was uncompletely broken out even after 200 seconds.

EXAMPLES 2 TO 6

The procedures were repeated in the same manner as described in Example 1 except the operating conditions were varied.

The experimental results are shown in the following Table 2.

TABLE 2

| Example Number | 2 | 3 | 4 | 5 | 6 |
|---|---|---|---|---|---|
| Starting powder: |  |  |  |  |  |
| Average particle size ($\mu$) | 25–30 | 25–30 | 25–30 | 170 | 25–30 |
| Bulk density (g./ml.) | 0.30 | 0.30 | 0.30 | 0.25 | 0.31 |
| Operating pressure (mm. Hg, absolute) | 10 | 10 | 10 | 100 | 10 |
| Agitation velocity (r.p.m.) | 140 | 140 | 70 | 140 | 280 |
| Operating temperature (° C.) | 35 | 42 | 33 | 36 | 45 |
| Operating period (minutes) | 30 | 30 | 30 | 40 | 80 |
| Obtained granular powder: |  |  |  |  |  |
| Average particle size ($\mu$) | 500 | 580 | 320 | 350 | 340 |
| Bulk density (g./ml.) | 0.72 | 0.80 | 0.52 | 0.65 | 0.50 |
| Angle of repose, degree | 42 | 36 | 47 | 45 | 48 |
| Broken period in aggregation test (sec.) | 21 | 18 | 32 | 28 | 40 |

All of these obtained powder does not occur any aggregates on storage or transport.

EXAMPLE 7

The procedure was repeated in the same manner as described in Example 5 except the operating temperature of 70° C. was used.

As the result, there was obtained polytetrafluoroethylene molding granular powder having an average particle size of 450 $\mu$, a bulk density of 0.69 g./ml. and an angle of repose of 40°.

EXAMPLE 8

A 500 liter double cone mixer was charged with 60 kg. of polytetrafluoroethylene powder (average particle size: 180 $\mu$, bulk density: 0.30 g./ml.) and then closed. The powder was subjected to mechanical agitation for 60 minutes under the condition of a pressure of 200 mm Hg (absolute) and a temperature of 35° C.

As the result, there was obtained polytetrafluoroethylene molding granular powder having an average particle size of 400 $\mu$, a bulk density of 0.65 g./ml. and an angle of repose of 45°.

What we claim is:

1. A method for preparing a free-flowing powder of a tetrafluoroethylene polymer selected from the group consisting of polytetrafluoroethylene and copolymers of tetrafluoroethylene containing not less than 95 percent by weight of tetrafluoroethylene and less than 5 percent by weight of a co-polymerizable monomer unit consisting essentially of subjecting powder of said tetrafluoroethylene polymer having an average particle size of less than 300 $\mu$ to mechanical agitation in an agitation vessel so as to make contact, bump or tumble the particles of said powder with each other or against the internal wall surface of said agitation vessel under a reduced pressure of less than 500 mm Hg (absolute)

at a temperature of 10° to 130° for a period of time until a free-flowing powder is obtained.

2. The method of claim 1, wherein the reduced pressure is less than 300 mm Hg (absolute).

3. The method of claim 1, wherein the reduced pressure is less than 100 mm Hg (absolute).

4. The method of claim 1, wherein the temperature ranges from 25° to 75° C.

5. The method of claim 1, wherein the average particle size of the powder of tetrafluoroethylene polymer is smaller than 200 μ.

6. The method of claim 1, wherein said co-polymerizable monomer unit is selected from the group consisting of hexafluoropropylene and trifluorochloroethylene.

* * * * *